United States Patent
Lee

(10) Patent No.: US 11,046,282 B2
(45) Date of Patent: Jun. 29, 2021

(54) AIRBAG FOR VEHICLE

(71) Applicants: Hyundai Motor Company, Seoul (KR); Kia Motors Corporation, Seoul (KR)

(72) Inventor: Seung Hwan Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 54 days.

(21) Appl. No.: 16/513,368

(22) Filed: Jul. 16, 2019

(65) Prior Publication Data

US 2020/0282943 A1 Sep. 10, 2020

(30) Foreign Application Priority Data

Mar. 6, 2019 (KR) .................. 10-2019-0025732

(51) Int. Cl.
*B60R 21/233* (2006.01)
*B60R 21/2338* (2011.01)
*B60R 21/239* (2006.01)

(52) U.S. Cl.
CPC ........ *B60R 21/233* (2013.01); *B60R 21/2338* (2013.01); *B60R 2021/2395* (2013.01); *B60R 2021/23332* (2013.01); *B60R 2021/23382* (2013.01)

(58) Field of Classification Search
CPC .............. B60R 21/233; B60R 21/2338; B60R 2021/23324; B60R 2021/23332; B60R 2021/23382; B60R 2021/23384; B60R 2021/2395
See application file for complete search history.

(56) References Cited

U.S. PATENT DOCUMENTS

| 3,929,350 | A | 12/1975 | Pech | |
|---|---|---|---|---|
| 7,264,268 | B2 * | 9/2007 | Ehrke | B60R 21/233 280/729 |
| 7,396,043 | B2 * | 7/2008 | Choi | B60R 21/233 280/743.1 |
| 7,673,901 | B2 * | 3/2010 | Hanawa | B60R 21/233 280/743.1 |
| 8,181,988 | B2 * | 5/2012 | Adachi | B60R 21/233 280/729 |
| 8,240,705 | B2 * | 8/2012 | Ishida | B60R 21/233 280/729 |

(Continued)

FOREIGN PATENT DOCUMENTS

| JP | H05246296 A | 9/1993 |
|---|---|---|
| JP | H0725303 A | 1/1995 |

(Continued)

*Primary Examiner* — Laura Freedman
(74) *Attorney, Agent, or Firm* — Mintz Levin Cohn Ferris Glovsky and Popeo, P.C.; Peter F. Corless

(57) ABSTRACT

An airbag for a vehicle includes a main chamber that deploys and inflates toward a passenger and has an empty space formed therein. A delay chamber is disposed in the empty space of the main chamber and is connected with the main chamber through a connecting portion. The delay chamber inflates in the empty space of the main chamber by receiving gas from the main chamber through the connecting portion when the main chamber is deployed.

13 Claims, 6 Drawing Sheets

(56) References Cited

U.S. PATENT DOCUMENTS

| | | | |
|---|---|---|---|
| 8,282,122 B2 * | 10/2012 | Marable | B60R 21/233 280/729 |
| 8,579,321 B2 * | 11/2013 | Lee | B60R 21/233 280/729 |
| 8,807,593 B2 * | 8/2014 | Lee | B60R 21/213 280/730.1 |
| 9,120,456 B2 | 9/2015 | Kobayashi | |
| 9,187,056 B1 * | 11/2015 | Kwon | B60R 21/2338 |
| 9,550,465 B1 * | 1/2017 | El-Jawahri | B60R 21/26 |
| 9,738,244 B2 * | 8/2017 | Lee | B60R 21/2338 |
| 9,956,937 B2 * | 5/2018 | Jindal | B60R 21/205 |
| 10,369,956 B2 * | 8/2019 | Deng | B60R 21/2338 |

FOREIGN PATENT DOCUMENTS

| | | |
|---|---|---|
| JP | 2009040220 A | 2/2009 |
| JP | 2011057142 A | 3/2011 |
| JP | 2013119330 A | 6/2013 |
| KR | 101720979 B1 | 3/2017 |

\* cited by examiner

AIRBAG FOR VEHICLE

CROSS-REFERENCE TO RELATED APPLICATION

This application claims the priority benefit of Korean Patent Application No. 10-2019-0025732, filed on Mar. 6, 2019, the disclosure of which is incorporated herein by reference.

BACKGROUND

1. Field of the Disclosure

The present disclosure relates to an airbag for a vehicle and, more particularly, to an airbag that secures safety for a passenger and reduces the possibility of breakage of the passenger's tympanums by improving the protective performance without increasing the size of an airbag cushion or an inflator.

2. Description of the Prior Art

Recently, as various automotive collision test modes are developed, the protective performance of airbags requires improvement. The volume of an airbag cushion may be increased to improve the protective performance of thereof, and thus, technologies are being developed with the aim of increasing the capacity of a cushion and an inflator to improve the protective performance.

However, when the capacities of a cushion and an inflator are excessively increased, low-frequency noise is increased when an airbag is deployed. Therefore, a tympanum of a passenger may be broken and the passenger's hearing ability may be permanently injured. Accordingly, it has been required to develop a conceptually new airbag cushion that may improve protective performance without increasing the capacity of an airbag.

The description provided above as a related art of the present disclosure is merely for helping understanding the background of the present disclosure and should not be construed as being included in the related art known by those skilled in the art.

SUMMARY

The present disclosure provides an airbag for a vehicle that secures safety for a passenger and reduces the possibility of breakage of the passenger's tympanums by improving the actual protective performance without increasing the size of an airbag cushion or an inflator.

In view of the above aspect, an airbag for a vehicle according to the present disclosure may include: a main chamber configured to deploy and inflate toward a passenger and having an empty space therein that is not filled with gas; and a delay chamber disposed in the empty space of the main chamber, connected with the main chamber via a connecting portion, and configured to inflate in the empty space of the main chamber by receiving gas from the main chamber through the connecting portion when the main chamber is deployed.

The main chamber may be connected to a vehicle at a first end to be supplied with gas from an inflator through the first end, and may be connected with the delay chamber through the connecting portion at an empty space at a second end. The cross-section cut toward a passenger of the main chamber may have a ring shape with a predetermined thickness and the inside of the ring shape may define the empty space.

Additionally, the main chamber may have the empty space in the center and both side ends of the empty space may be open. The main chamber and the delay chamber may form a single cushion by being connected via the connecting portion. A first variable vent may be disposed at the connecting portion, may open the connecting portion in a normal state, and may close the connecting portion when the delay chamber is fully deployed, thereby preventing the internal pressure of the delay chamber from leaking into main chamber.

A first end of a first tether may be connected to the first variable vent and a second end of the first tether may be connected across the inside of the delay chamber to an end of the delay chamber opposite to the connecting portion. When the delay chamber is fully deployed, the first tether may pull the first variable vent to close the connecting portion.

The main chamber may include a connecting aperture that communicates with the connecting portion, and the first variable vent may have a panel shape that covers the connecting aperture and may be coupled to the main chamber with the center portion of the panel bent. Thus, both open sides of the first variable vent may communicate with the connecting portion through the connecting aperture. The first end of the first tether may be connected to the panel center of the first variable vent. Accordingly, when the first tether is pulled, the bending panel center portion of the first variable vent may be deformed and may block the connecting aperture.

A second variable vent may be disposed at the upstream side in a gas inflow direction from the connecting portion in the main chamber, may be open in a normal state, and may be closed together when the first variable vent is closed. The second variable vent may be connected with the first variable vent via a second tether. Therefore, when the first variable vent is closed, the second tether may be pulled and the second variable vent may be closed.

A third variable vent may be disposed at the downstream side in a gas inflow direction from the connecting portion in the main chamber, may be open in a normal state, and may be closed when the main chamber is fully deployed. The third variable vent may be connected with the lower end in the main chamber via a third tether. Therefore, when the main chamber is fully deployed, the third tether may be pulled and the third variable vent may be closed. When the delay chamber is fully deployed, the delay chamber may be positioned in the lower space of the empty space of the main chamber and the upper space of the empty space of the main chamber may remain empty.

According to an airbag for a vehicle according to the present disclosure, it may be possible to secure safety for a passenger and reduce the possibility of breakage of the passenger's tympanums by improving the actual protective performance without increasing the sizes of an airbag cushion and an inflator.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
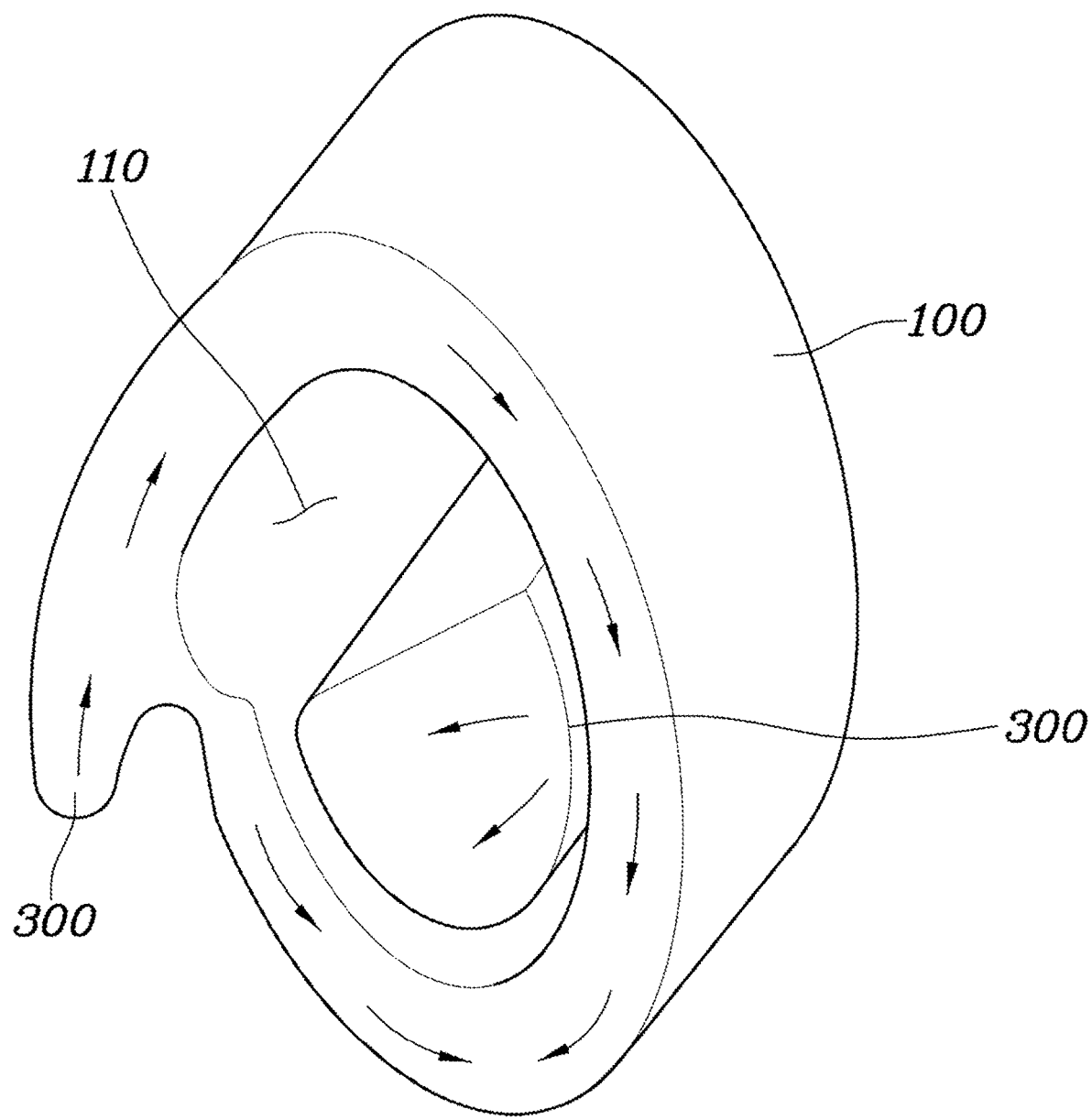
FIG. 1 is a perspective view of an airbag for a vehicle according to an exemplary embodiment of the present disclosure.
Figure 4:
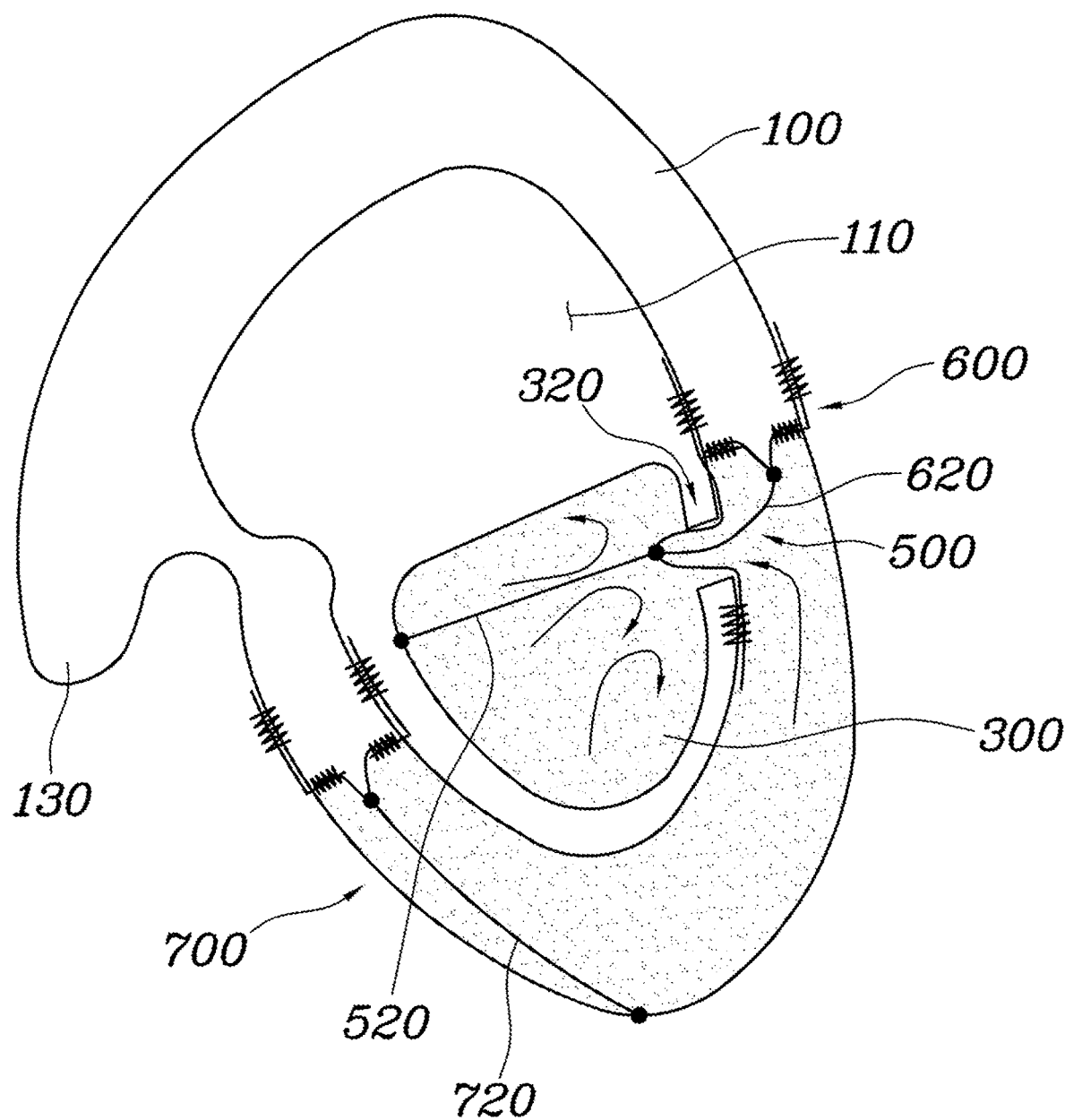
Figure 5:
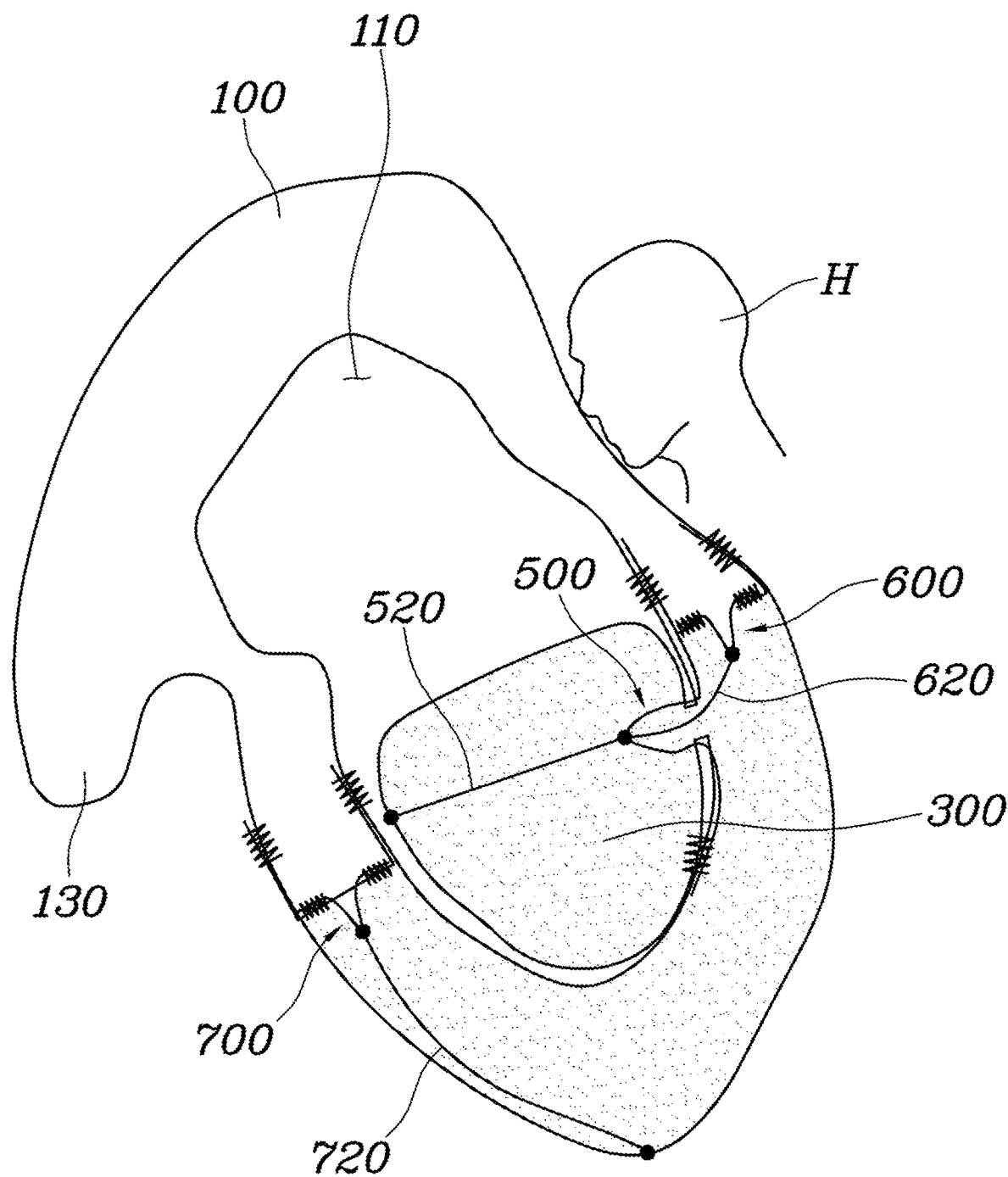
Figure 6:
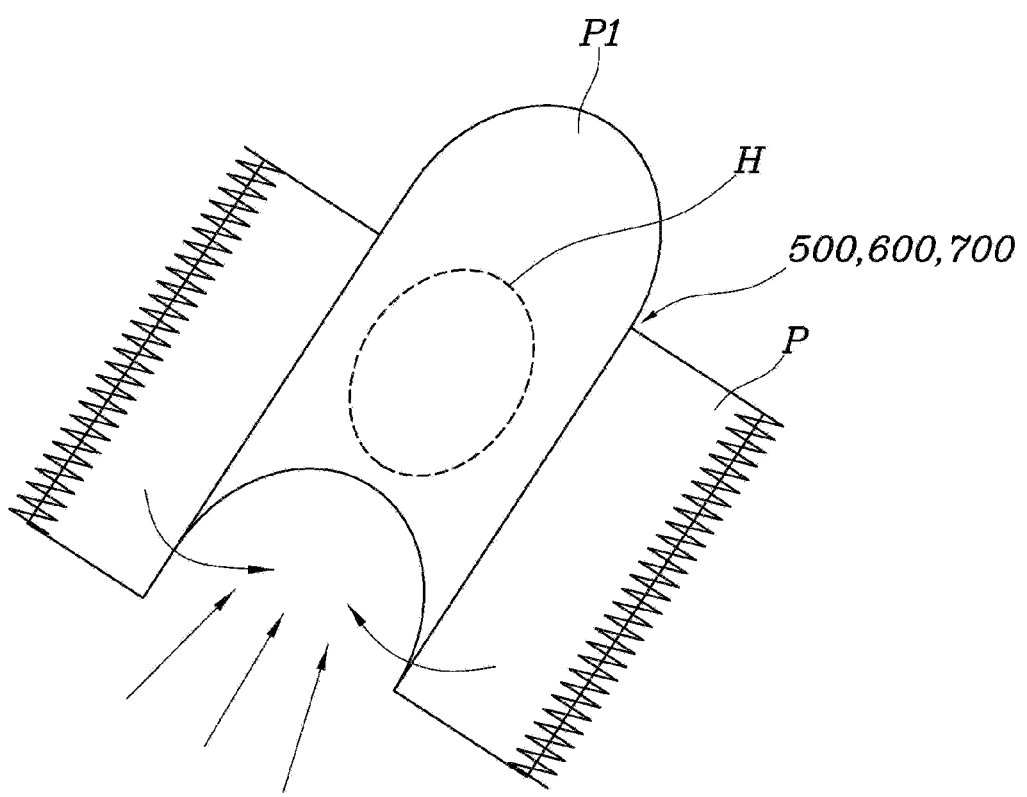
FIG. 6 is a view showing a variable vent that is applied to an airbag for a vehicle according to an exemplary embodiment of the present disclosure.

FIG. 1 is a perspective view of an airbag for a vehicle according to an exemplary embodiment of the present disclosure, FIGS. 2 to 5 are views showing a process deploying of an airbag for a vehicle according to an exemplary embodiment of the present disclosure, and FIG. 6 is a view showing a variable vent that is applied to an airbag for a vehicle according to an exemplary embodiment of the present disclosure.

FIG. 1 is a perspective view of an air airbag for a vehicle according to an exemplary embodiment of the present disclosure and the airbag for a vehicle according to the present disclosure may include: a main chamber 100 configured to deploy and inflate toward a passenger and having an empty space 110 formed there that is not filled with gas; and a delay chamber 300 disposed in the empty space 110 of the main chamber 100, connected with the main chamber 100 via a connecting portion 320, and configured to inflate in the empty space 110 of the main chamber 100 by receiving gas from the main chamber 100 through the connecting portion 320 when the main chamber 100 is deployed.

In the present disclosure, the empty space 110 may be defined in the main chamber 100 to prevent an increase in the capacity of an airbag cushion. The cross-sectional shape of the main chamber 100 may have a ring shape with a predetermined thickness and the elasticity of the ring shape may reduce the shock applied to a passenger. Further, the entire outer volume may be increased while the actual volume is not increased due to the internal empty space 110.

The rigidity of the cushion may be decreased when the internal empty space 110 is too large, and thus, the separate delay chamber 300 may be set in the empty space 110. The delay chamber 300 may be inflated by the gas supplied from the main chamber 100 when deployed. After fully deploying, the delay chamber 300 has an independent inflation space since there is no gas exchange with the main chamber 100. Accordingly, the delay chamber 300 may maintain rigidity in the main chamber 100. In particular, as shown in FIG. 1, the delay chamber 300 may be disposed in the lower space in the empty space 110 of the main chamber 100, and thus, the upper space has low rigidity and the lower space has high rigidity in the main chamber 100.

Accordingly, as shown in FIG. 5, when a passenger is loaded (e.g., is seated within the vehicle), the passenger's head H is positioned at the upper space of the main chamber 100 and thus, shocks may be absorbed sufficiently, and the chest may be supported against displacement by the lower space. Therefore, the generated shocks may be absorbed, displacement may be reduced, and lurching of the neck may be prevented, thereby improving protective performance. Further, since the empty space 110 is disposed in the main chamber 100, the actual volume of the cushion may be maintained at the same level as previously even though the overall size of the cushion is increased, so it may be possible to prevent an injury to the passenger's hearing when the airbag is deployed.

Particularly, the main chamber 100 may be deployed and inflated toward a passenger and the empty space 110 that is not filled with gas is defined therein. The delay chamber 300 may be disposed in the empty space 110 of the main chamber 100, may be connected with the main chamber 100 via the connecting portion 320, and may be inflated in the empty space 110 of the main chamber 100 by receiving gas from the main chamber 100 through the connecting portion 320 when the main chamber 100 is deployed.

The main chamber 100 may include an end 130 (e.g., a first end) connected to a vehicle to be supplied with gas from an inflator (not shown) through the end 130 and may be connected with the delay chamber 300 through the connecting portion 320 at an empty space at a second end. The exemplary embodiment shown in the figures shows a passenger airbag, in which an inflator is disposed in a housing inside a crash pad and a cushion is deployed toward a passenger, as shown in the figures. The delay chamber 300, which is supplied with gas through the connecting portion 320 in the main chamber 100, eliminates a separate inflator. The cross-section cut toward a passenger of the main chamber 100 may have a ring shape with a predetermined thickness and the inside of the ring shape may define the empty space 110. Accordingly, the main chamber 100 itself may have elasticity and rigidity.

Additionally, the main chamber 100 may have the empty space 110 in the center thereof and both side ends of the empty space 110 may be open. The main chamber 100 and the delay chamber 300 form a single cushion by being connected through the connecting portion 320. For the convenience of manufacturing, both side ends of the main chamber 100 may be open and the delay chamber 300 may be set in the empty space 110 to be easily manufactured in a single cushion. Further, there is also an effect of reducing an unnecessary gas space by opening both side ends of the main chamber 100 that play a smaller role in reducing shocks that are applied to a passenger.

Figure 2:
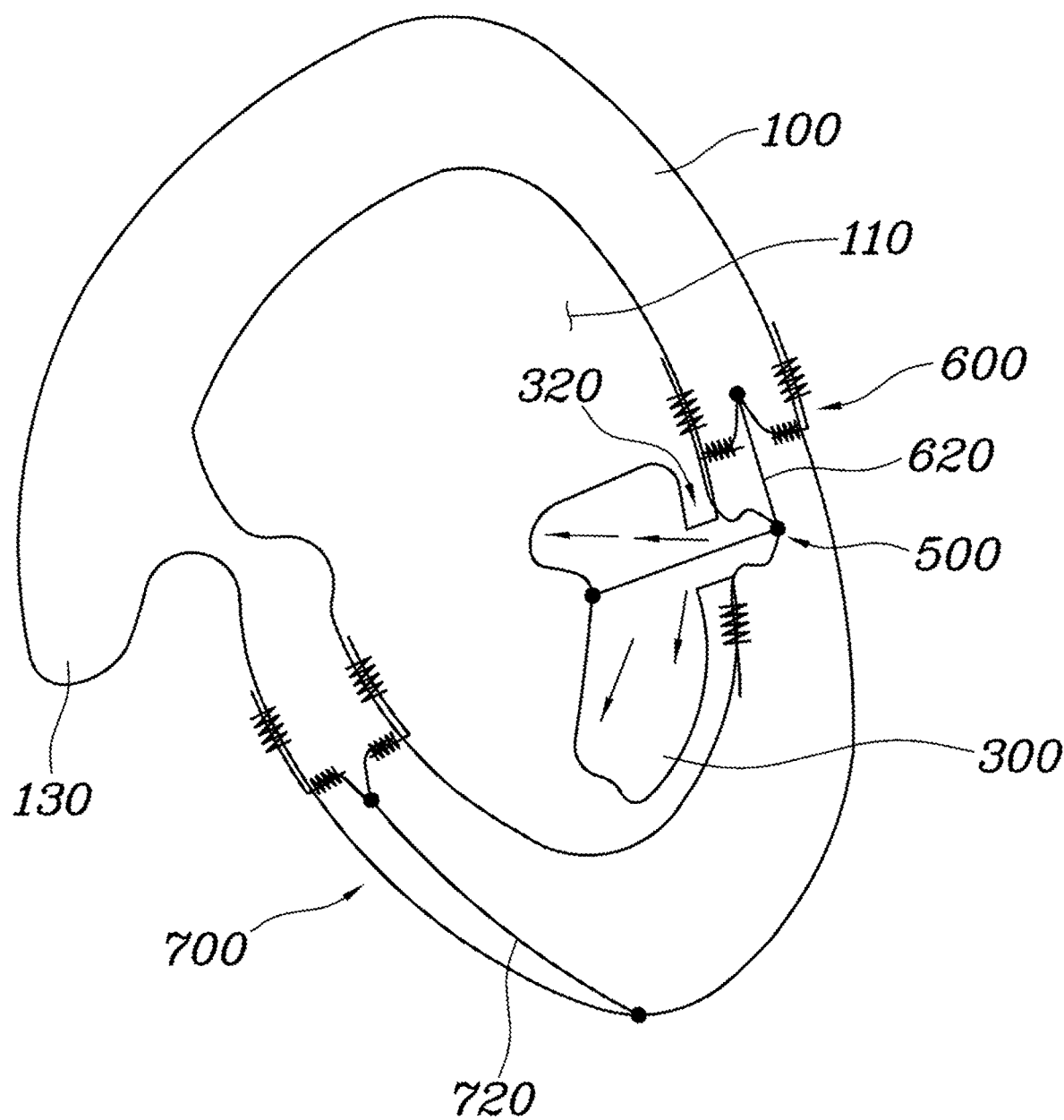
FIGS. 2 to 5 are views showing a process of deploying an airbag for a vehicle according to an exemplary embodiment of the present disclosure.

A first variable vent 500 may be disposed at the connecting portion 320, may open the connecting portion 320 in a normal state, and close the connecting portion 320 when the delay chamber 300 is fully deployed, thereby being able to prevent the internal pressure of the delay chamber 300 from leaking into the main chamber 100. In other words, the first variable vent 500 may open in a normal state, as shown in FIG. 2, to introduce gas into the delay chamber 300 through the connecting portion 320.

Figure 3:
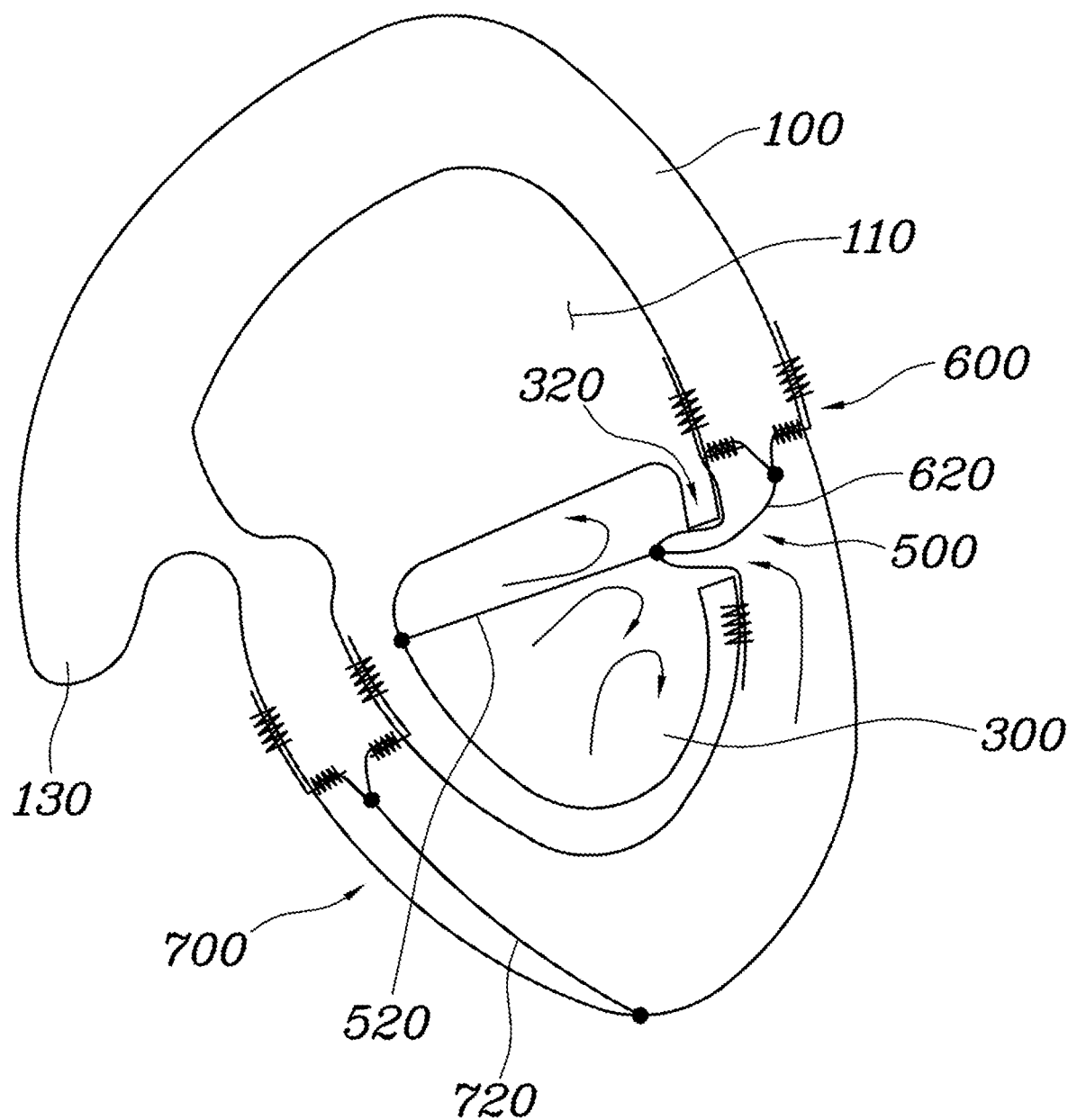

A first end of a first tether 520 may be connected to the first variable vent 500 and a second end of the first tether 520 may be connected across the inside of the delay chamber 300 to an end of the delay chamber 300 opposite the connecting portion 320. Accordingly, when the delay chamber 300 is fully deployed, the first tether 520 may pull the first variable vent 500 to close the connecting portion 320. In other words, when deploying progresses and the delay chamber 300 is fully deployed, as shown in FIG. 3, the first tether 520 may pull the first variable vent 500, to thus close the first variable vent 500. Accordingly, the delay chamber 300 may maintain the internal pressure in the fully deployed state. As the internal pressure is maintained, when a passenger is loaded, the passenger's chest may be supported, thereby minimizing displacement of the chest.

A second variable vent 600 may be disposed at the upstream side in the gas inflow direction from the connecting portion 320 in the main chamber 100. The second variable vent 600 may be open in a normal state and, when the first variable vent 500 is closed, may be closed therewith. The second variable vent 600 may be connected with the first variable vent 500 via a second tether 620. Therefore, when the first variable vent 500 is closed, the second tether 620 may be pulled to close the second variable vent 600. In other words, as the delay chamber 300 is fully deployed, the first variable vent 500 may be pulled and closed. In this process, the second tether 620 may pull the second variable vent 600, and thus, as shown in FIG. 3, the portion with the second variable vent 600 of the main chamber 100 may be closed.

Further, a third variable vent 700 may be disposed at the downstream side in the gas inflow direction from the connecting portion 320 in the main chamber 100. The third variable vent 700 may be open in a normal state and may be closed when the main chamber 100 is fully deployed. The third variable vent 700 may be connected with the lower end in the main chamber 100 via a third tether 720. Therefore, when the main chamber 100 is fully deployed, the third tether 720 may be pulled to close the third variable vent 700.

In other words, when the main chamber 100 is fully deployed, as shown in FIG. 4, the third tether 720 may be pulled and the third variable vent 700 may also be closed, to maintain the delay chamber 300 at high pressure in a separate state. Further, the lower space of the main chamber 100 between the second variable vent 600 and the third variable vent 700 may be maintained at high pressure in an independent state.

When the delay chamber 300 is fully deployed, the delay chamber 300 may be positioned in the lower space of the empty space of the main chamber 100 and the upper space of the empty space of the main chamber 100 may maintain the empty space 110. According, as shown in FIG. 5, when a passenger is loaded, the head H of the passenger may be loaded to the upper space of the main chamber 100 where pressure is relatively low and the empty space 110 is defined, and thus, displacement is allowed and shock may be sufficiently absorbed. Further, the passenger's chest may be supported with displacement maximally suppressed by the lower space of the main chamber 100 and the delay chamber 300 maintained at high pressure. Accordingly, the ability to protect the head H, chest, and neck of the passenger is improved substantially. Further, there is no need to increase the capacity of the cushion to achieve this effect, so it is possible to prevent an injury to the passenger's hearing.

FIG. 6 is a view showing a variable vent that is applied to an airbag for a vehicle according to an exemplary embodiment of the present disclosure. The first variable vent 500 and the third variable vent 700 may be designed under the same technical aspect. The first variable vent 500 is exemplified in the following description. As for the first variable vent 500, the main chamber 100 may include a connecting aperture H that communicates with the connecting portion and the first variable vent 500 may have the shape of a panel P that covers the connecting aperture H. The first variable vent 500 may be coupled to the main chamber 100 with the center portion P1 of the panel bent, so both open sides of the first variable vent 500 may communicate with the connecting portion 320 through the connecting aperture H.

In this configuration, a first end of the first tether 520 may be connected to the panel center of the first variable vent 500, and thus when the first tether 520 is pulled toward the delay chamber 300, the bending panel center portion P1 of the first variable vent 500 may be deformed and pulled toward the connecting aperture H. Accordingly, the panel center portion P1 of the first variable vent 500 may block the connecting aperture H. It will be understood that the other variable vents may be similar in that they have a bending panel shape that opens an aperture in a normal state and the bending portion of the panel is deformed and blocks the aperture when they are pulled by tethers, whereby they are closed. Alternatively, various techniques for operating these variable vents in association with tethers have been proposed, and all variable venting techniques known in the art may be applied to the variable vents of the present disclosure.

According to an airbag for a vehicle according to the present disclosure, it may be possible to secure safety for a passenger and reduce the possibility of breakage of the passenger's tympanums by improving the actual protective performance without increasing the sizes of an airbag cushion and an inflator.

Although the present disclosure was provided above in relation to exemplary embodiments shown in the drawings, it will be apparent to those skilled in the art that the present disclosure may be changed and modified in various ways without departing from the scope of the present disclosure, which is described in the following claims.

What is claimed is:

1. An airbag for a vehicle, comprising:
   a main chamber configured to deploy and inflate toward a passenger and having an empty space formed therein; and
   a delay chamber disposed in the empty space of the main chamber, connected with the main chamber via a connecting portion, and configured to inflate in the empty space of the main chamber by receiving gas from the main chamber through the connecting portion when the main chamber is deployed,
   wherein a first variable vent is disposed at the connecting portion, opens the connecting portion in a normal state, and closes the connecting portion when the delay chamber is fully deployed to prevent internal pressure of the delay chamber from leaking into the main chamber.

2. The airbag of claim 1, wherein the main chamber is connected to the vehicle at a first end to be supplied with gas from an inflator through the first end, and is connected with the delay chamber through the connecting portion at an empty space at a second end.

3. The airbag of claim 1, wherein a cross-section cut toward the passenger of the main chamber has a ring shape with a predetermined thickness and an inside of the ring shape defines the empty space.

4. The airbag of claim 3, wherein the main chamber has the empty space in a center thereof and both side ends of the empty space are open.

5. The airbag of claim 1, wherein the main chamber and the delay chamber form a single cushion by being connected through the connecting portion.

6. The airbag of claim 1, wherein a first end of a first tether is connected to the first variable vent, a second end of the first tether is connected across an inside of the delay chamber to an end of the delay chamber opposite the connecting portion, and when the delay chamber is fully deployed, the first tether pulls the first variable vent to close the connecting portion.

7. The airbag of claim 6, wherein the main chamber includes a connecting aperture that communicates with the connecting portion, and the first variable vent has a panel shape that covers the connecting aperture and is coupled to the main chamber with a center portion of the panel shape being bent, wherein both open sides of the first variable vent communicate with the connecting portion through the connecting aperture.

8. The airbag of claim 7, wherein the first end of the first tether is connected to a center of the panel shape of the first variable vent and the center portion of the panel shape of the first variable vent is deformed and blocks the connecting aperture when the first tether is pulled.

9. The airbag of claim 1, wherein a second variable vent is disposed at an upstream side in a gas inflow direction from the connecting portion in the main chamber, is open in a normal state, and is closed together when the first variable vent is closed.

10. The airbag of claim 9, wherein the second variable vent is connected with the first variable vent via a second tether, and when the first variable vent is closed, the second tether is pulled and the second variable vent is closed.

11. The airbag of claim 1, wherein a third variable vent is disposed at a downstream side in a gas inflow direction from the connecting portion in the main chamber, is open in a normal state, and is closed when the main chamber is fully deployed.

12. The airbag of claim 11, wherein the third variable vent is connected with a lower end in the main chamber via a third tether, and when the main chamber is fully deployed, the third tether is pulled and the third variable vent is closed.

13. The airbag of claim 1, wherein when the delay chamber is fully deployed, the delay chamber is positioned in a lower space of the empty space of the main chamber and an upper space of the empty space of the main chamber remains empty.

* * * * *